(12) United States Patent
Yamada

(10) Patent No.: US 10,705,779 B2
(45) Date of Patent: Jul. 7, 2020

(54) COMPUTER-READABLE STORAGE MEDIUM FOR INFORMATION PROCESSING APPARATUS HAVING SWITCHABLE PROCESSING CHANNELS

(71) Applicant: BROTHER KOGYO KABUSHIKI KAISHA, Nagoya-shi, Aichi (JP)

(72) Inventor: Jun Yamada, Nagoya (JP)

(73) Assignee: BROTHER KOGYO KABUSHIKI KAISHA, Nagoya-Shi, Aichi (JP)

( * ) Notice: Subject to any disclaimer, the term of this patent is extended or adjusted under 35 U.S.C. 154(b) by 0 days.

(21) Appl. No.: 16/266,177

(22) Filed: Feb. 4, 2019

(65) Prior Publication Data

US 2019/0303075 A1 Oct. 3, 2019

(30) Foreign Application Priority Data

Mar. 27, 2018 (JP) .................. 2018-059838

(51) Int. Cl.
 *G06F 3/12* (2006.01)
(52) U.S. Cl.
 CPC .......... *G06F 3/1254* (2013.01); *G06F 3/1204* (2013.01); *G06F 3/1255* (2013.01); *G06F 3/1273* (2013.01); *G06F 3/1285* (2013.01)
(58) Field of Classification Search
 None
 See application file for complete search history.

(56) References Cited

U.S. PATENT DOCUMENTS

| 2011/0063659 A1* | 3/2011 | Sakura | G06F 3/1205 358/1.15 |
|---|---|---|---|
| 2012/0212781 A1* | 8/2012 | Kohata | G06F 3/1207 358/1.15 |

FOREIGN PATENT DOCUMENTS

JP 2011-060150 A 3/2011

\* cited by examiner

*Primary Examiner* — Andrew H Lam
(74) *Attorney, Agent, or Firm* — Scully Scott Murphy and Presser

(57) ABSTRACT

A non-transitory computer readable storage medium storing computer readable instructions that are executable by a computer in an information processing apparatus is provided. The computer readable instructions cause the information processing apparatus to conduct a print control being one of a first print control, in which printing of an image is processed through a first channel, and a second print control, in which printing of the image is processed through a second channel; accept a selection for a printer; determine whether the print control is to be switched from the first print control to the second control based on the selection for the printer; obtain history of the first print control conducted in past in the selected printer; and set a print setting value for the second print control to be conducted in the selected printer based on the obtained history.

16 Claims, 10 Drawing Sheets

FIG. 4

- 611: Number of Copies [1]
- 612: Numbering — Count [1]
- 613: Cutting Option
  - ☑ Auto-cut
  - ☐ Half-cut
  - ☐ Chain-printing
  - ☐ Special tape
- 614: Print Quality
  - ◉ Priority on speed, 300 by 300 dpi
  - ○ Priority on quality, 300 by 300 dpi
  - ○ High resolution, 300 by 600 dpi
- 615: Print Start
  - ◉ Start printing as soon as the printer starts receiving data.
  - ○ Start printing when the printer receives data for one page.
- 616: Halftone
  - ○ Optimized for logo/text
  - ○ Optimized for text/graphic
  - ◉ Optimized for general label including image
- 617: Brightness / Contrast
- 618: ☑ Bidirectional Communication
- 619: ☐ Horizontal Flip 62: Cancel    63: Done 611 — Number of Copies: 1

612 — Numbering
Count: 1

613 — Cutting Option
- ☑ Auto-cut
- ☐ Half-cut
- ☐ Chain-printing
- ☐ Special tape

ABC ABC

614 — Print Quality
- ◉ Priority on speed, 300 by 300 dpi
- ○ Priority on quality, 300 by 300 dpi
- ○ High resolution, 300 by 600 dpi 615 — Print Start
- ◉ Start printing as soon as the printer starts receiving data.
- ○ Start printing when the printer receives data for one page.

616 — Halftone
- ○ Optimized for logo/text
- ○ Optimized for text/graphic
- ◉ Optimized for general label including image 617 — Brightness
Contrast 618 — ☐ Bidirectional Communication 619 — ☑ Horizontal Flip Cancel (62)   Done (63)

FIG. 5

- 611 — Number of Copies: 1
- 612 — Numbering, Count: 1
- 613 — Cutting Option:
  - ☑ Auto-cut
  - ☐ Half-cut
  - ☐ Chain-printing
  - ☐ Special tape
- 614 — Print Quality:
  - ⦿ Priority on speed, 300 by 300 dpi
  - ○ Priority on quality, 300 by 300 dpi
  - ○ High resolution, 300 by 600 dpi
- 615 — Print Start:
  - ⦿ Start printing as soon as the printer starts receiving data.
  - ○ Start printing when the printer receives data for one page.
- 616 — Halftone:
  - ○ Optimized for logo/text
  - ○ Optimized for text/graphic
  - ⦿ Optimized for general label including image
- 617 — Brightness / Contrast
- 618 — ☐ Bidirectional Communication
- 619 — ☑ Horizontal Flip Cancel (62)   Done (63)

<Queue File>

| Application Name | File Name | Device Name | Protocol | Print Setting Info. | Printing Date | Communication I/F Info. |
|---|---|---|---|---|---|---|
| x x x | | Printing Apparatus 1A | CUPS | Print Setting Info. | 2018.01.25 | NW |
| x x x | | Printing Apparatus 1A | CUPS | Print Setting Info. | 2018.01.24 | NW |

<Print History File>

| File Name | Device Name | Protocol | Print Setting Info. | Printing Date | Communication I/F Info. |
|---|---|---|---|---|---|
| x x x | Printing Apparatus 1B | CUPS | Print Setting Info. | 2018.01.25 | NW |
| x x x | Printing Apparatus 1A | CUPS | Print Setting Info. | 2018.01.24 | NW |

411, 412

COMPUTER-READABLE STORAGE MEDIUM FOR INFORMATION PROCESSING APPARATUS HAVING SWITCHABLE PROCESSING CHANNELS

CROSS REFERENCE TO RELATED APPLICATION

This application claims priority from Japanese Patent Application No. 2018-059838, filed on Mar. 27, 2018, the entire subject matter of which is incorporated herein by reference.

BACKGROUND

Technical Field

An aspect of the present disclosure is related to a computer-readable storage medium storing a program to be installed in an information processing apparatus, which is capable of communicating with a printer. Specifically, the present disclosure is related to print setting values for the program to be installed in the information processing apparatus.

Related Art

A technique to set print setting values automatically in an information processing apparatus, which is capable of communicating with a printer, is known. For example, while a plurality of printer drivers may be installed in an information processing apparatus, a printer driver to be used in the information processing apparatus may be switched from one to another, and print setting values for the former printer driver may be inherited to the latter printer driver automatically.

SUMMARY

The print setting values may be passed over from one printer driver to another printer driver by an aid of an operating system, which enables sharing the print setting values among a plurality of printer drivers. Meanwhile, between the information processing apparatus and the printer, a plurality of processing channels to process a print job may be available. The processing channels may include a channel, which involves a printer driver, and a channel, which does not involve any printer driver. In this regard, if an application program in the information processing apparatus is enabled to switch the processing channels from one that involves a printer driver to another that does not involve any printer driver, or vice versa, while the same printer is designated to be used, the above-mentioned technique to pass the print setting values from one printer driver to another printer driver may not be applicable. Therefore, a user may be required to set the print setting values manually, which may be burden on the user.

The present disclosure is advantageous in that a technique, which may reduce the burden on the user, when the user uses an application program installed in an information processing apparatus capable of communicating with a printer, is provided.

According to an aspect of the present disclosure, a non-transitory computer readable storage medium storing computer readable instructions that are executable by a computer in an information processing apparatus, is provided. The information processing apparatus includes a communication interface, through which the information processing apparatus is connected with a printer. The information processing apparatus is configured to, in response to receiving through the communication interface a command that causes the printer to print an image, conduct a print control. The print control includes a first print control, in which printing of the image is processed through a first channel, and a second print control, in which printing of the image is processed through a second channel different from the second channel. The computer readable instructions, when executed by the computer, cause the computer to accept a selection for the printer, determine whether the print control is to be switched from the first print control to the second control based on the selection for the printer, based on a determination that the print control is to be switched from the first print control to the second print control, obtain history of the first print control conducted in past in the selected printer, and based on the obtained history of the first print control, set a print setting value for the second print control to be conducted in the selected printer.

BRIEF DESCRIPTION OF THE ACCOMPANYING DRAWINGS

FIG. 4 is an illustrative view of a print setting screen, corresponding to a first channel, to be displayed in the information processing apparatus according to the embodiment of the present disclosure.

FIG. 5 is an illustrative view of a print setting screen, corresponding to a second channel, to be displayed in the information processing apparatus according to the embodiment of the present disclosure.

FIG. 6 is an illustrative view of a print setting screen, corresponding to a third channel, to be displayed in the information processing apparatus according to the embodiment of the present disclosure.

FIG. 8A illustrates a data structure in a queue file to be stored in the printing system according to the embodiment of the present disclosure. FIG. 8B illustrates a data structure in a print history file to be stored in the printing system according to the embodiment of the present disclosure.

DETAILED DESCRIPTION

Hereinafter, with reference to the accompanying drawings, described below will be a printing system 100 according to the embodiment of the present disclosure.

Figure 1:
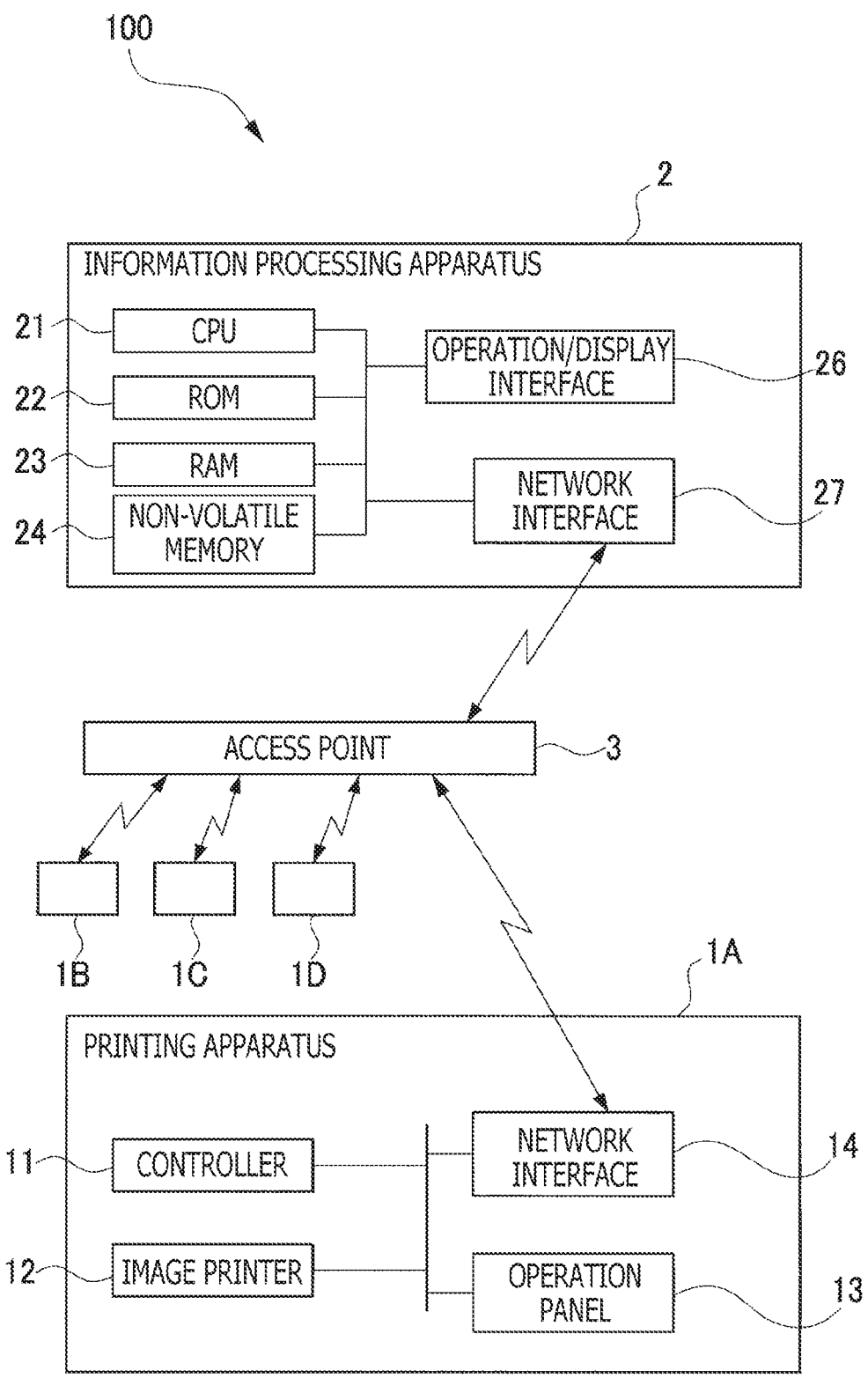
FIG. 1 is a block diagram to illustrate a printing system according to an embodiment of the present disclosure.

The printing system 100 according to the present embodiment includes, as shown in FIG. 1, printing apparatuses 1A, 1B, 1C, 1D and an information processing apparatus 2 that may communicate with each other. The printing apparatuses 1A, 1B, 1C, 1D may each print an image on a printable medium and may include, for example, a label printer, a page printer, a copier, and a multifunction peripheral device. The information processing apparatus 2 may generate and edit image data for the image to be printed in the printing apparatuses 1A, 1B, 1C, 1D, and transmit a print execution command and the image data to the printing apparatus 1. The information processing apparatus 2 may include, for example, a smartphone, a personal computer, and a tablet computer. The information processing apparatus 2 in the printing system 100 may not necessarily be limited to a single information processing apparatus 2 but may include a plurality of information processing apparatuses 2. Meanwhile, the printing system 100 may not necessarily have the plurality of printing apparatuses 1A, 1B, 1C, 1D but may solely has a single printing apparatus.

In the present embodiment, the printing system 100 shown in FIG. 1 includes the information processing apparatus 2 and the four (4) printing apparatuses 1A, 1B, 1C, 1D. In the following paragraphs, unless otherwise noted, the printing apparatuses 1A, 1B, 1C, 1D may be collectively called as a printing apparatus 1.

The printing apparatus 1 includes, as shown in FIG. 1, a controller 11, an image printer 12, an operation panel 13, and a network interface 14. The controller 11 includes a CPU and a memory, such as a flash ROM and a RAM, and may control devices and parts in the printing apparatus 1.

The controller 11 may not necessarily be limited to a single piece of hardware controller but may include a plurality of hardware devices, such as the CPU, which may collectively control the printing apparatus 1. For example, the controller 11 may include an application specific integrated circuit (ASIC). In this regard, the ASIC may serve as a functional part of the CPU, or a logic circuit may serve as a functional part of the controller 11.

The image printer 12 may print an image on a printable medium based on image data transmitted from the information processing apparatus 2. The image printer 12 may print an image in one of various image forming methods, including thermal-printing, electro-photographic printing, and inkjet printing. The printing apparatus 1 may be capable of printing either colored images or monochrome images.

The image printers 12 in the printing apparatuses 1A, 1B, 1C, 1D may each employ different image forming methods. In the present embodiment, the image printer 12 in the printing apparatus 1A employs a monochrome thermal-printing method and may print monochrome images on a label which is in a form of a strip of tape (rolled paper). In other words, the printing apparatus 1A is a label printer capable of printing images on a label medium.

The image printer 12 in the printing apparatus 1B employs a multicolored electro-photographic printing method. The image printer 12 in the printing apparatus 1C employs a multicolored inkjet-printing method. The image printer 12 printing apparatus 1D employs a monochrome electro-photographic printing method. The printing apparatuses 1B-1D may print images on sheet-formed printing medium (cut paper). Meanwhile, the combination of the printing methods for the image printers 12 in the printing apparatuses 1A-1D is merely an example and may not necessarily be limited to the exemplary combination described above.

The operation panel 13 may include, for example, a touch panel, which may accept a user's input and display information. The operation panel 13 may include indicator lamps and buttons.

The network interface 14 is a hardware device to establish communication with an external device including the information processing apparatus 2.

The information processing apparatus 2 includes, as shown in FIG. 1, a CPU 21, a ROM 22, a RAM 23, a non-volatile memory 24, an operation/display interface 26, and a network interface 27. The ROM 22 may store programs including an activation program to activate the information processing apparatus 2. The RAM 23 may be used as a work area for processing data and as a temporary memory area to store data temporarily. The non-volatile memory 24 may be, for example, an HDD and a flash memory, and store programs and data therein.

The CPU 21 may process information according to the programs called from the ROM 22 and the non-volatile memory 24.

The operation/display interface 26 includes a keyboard, a mouse, and a display, which are not shown. In other words, the keyboard, the mouse, and the display are connected to the information processing apparatus 2 through the operation/display interface 26. The operation/display interface 26 may include a display device and a touch panel arranged over the display device.

The network interface 27 is a hardware device to establish communication with an external device including the printing apparatus 1.

In the printing system 100, the information processing apparatus 2 and the printing apparatus 1 may communicate with each other wirelessly in conformity with Wi-Fi (registered trademark) standard through a common access point 3. In this regard, the network interfaces 14, 27 are interfaces that enable wireless communication in conformity with the Wi-Fi standard, more specifically, with IEEE 802.11 standard or other standards in compliance with IEEE 802.11. However, the technology to establish wireless communication between the information processing apparatus 2 and the printing apparatus 1 may not necessarily be limited to the Wi-Fi standard. For example, the information processing apparatus 2 and the printing apparatus 1 may communicate with each other through wires or wirelessly through direct connection without communicating through the access point 3.

Figure 2:
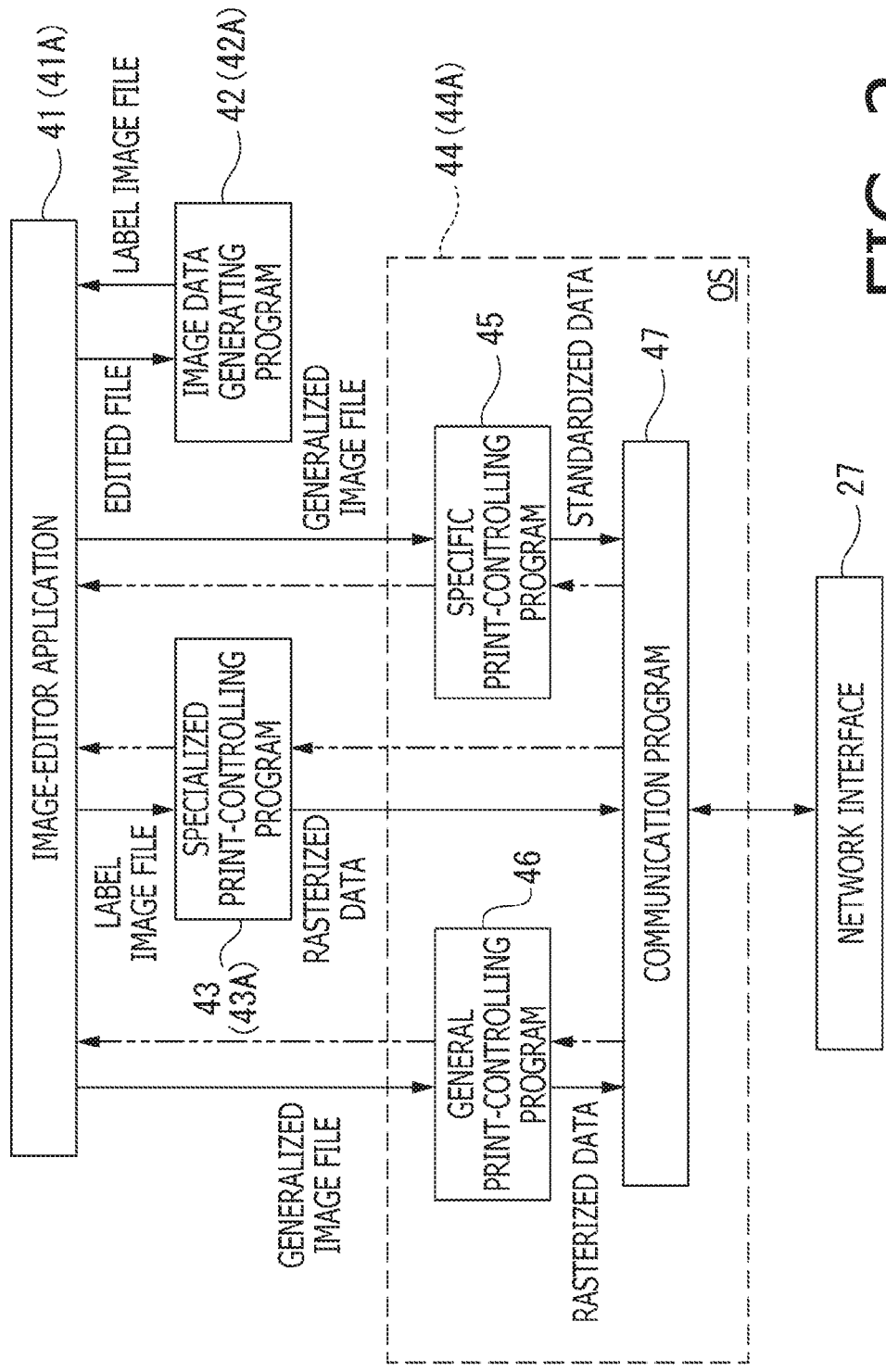
FIG. 2 is a block diagram to illustrate printable programs in an information processing apparatus in the printing system according to the embodiment of the present disclosure.

The non-volatile memory 24 in the information processing apparatus 2 stores, as shown in FIG. 2, an image-editor application 41 being an application program for editing images, an image data generating program 42, a specialized print-controlling program 43, an operating system (OS) 44. The OS 44 in the information processing apparatus 2 includes a specific print-controlling program 45, a general print-controlling program 46, and a communication program 47.

Optionally, the non-volatile memory 24 may be divided into a plurality of partitions, and one of the partitions may contain an OS 44A, which is different from the OS 44 installed in the other partitions; and an image-editor application program 41A, an image data generating program 42A, and specialized print-controlling program 43A, which are enabled to run on the OS 44A.

In the following paragraphs, an application program may be referred to as an application. In FIG. 2, directions of data flows from one program to another program are indicated by solid arrows.

The image-editor application 41 may be an imaging program having functions to, for example, accept commands from a user, display an image, and edit and save the image through the operation/display interface 26. The image-editor application 41 in the present embodiment is a program to generate and edit a label image file usable with the printing apparatus 1A.

The label image file is a data file, which may be used to print an image on the tape-formed label medium. The image-editor application 41 further has functions to read the generated label image file, accept a print command, and accept setting options for printing the image.

The image-editor application 41 further has a function to obtain status information from the printing apparatus 1 through any one of the specialized print-controlling program 43, the specific print-controlling program 45, and the general print-controlling program 46, as indicated by dash-and-dots lines in FIG. 2. The status information may include, for example, a print completion report and an error report.

The image data generating program 42 is a program having a function to create an image file for an image to be printed. The image data generating program 42 in the information processing apparatus 2 may, for example, create the label image file according to a command entered through the image-editor application 41. A process to generate the label image file in the image-editor application 41 may include a step, in which the image-editor application 41 outputs a command for generating the label image file to the image data generating program 42, and a step, in which the image-editor application 41 obtains the label image file generated in the image data generating program 42.

The specialized print-controlling program 43 is a program having functions to, for example, generate rasterized data, by rasterizing image data contained in the label image file, and control the communication program 47 to transmit the generated rasterized data to the printing apparatus 1A. The specialized print-controlling program 43 may be designed to specifically control the printing apparatus 1A, which is a printing apparatus in a specific model. Therefore, the specialized print-controlling program 43 may not control a printing apparatus in a different model from a different manufacturer. In this regard, the specialized print-controlling program 43 may generate rasterized data in a format, which is feasible specifically to the printing apparatus 1A.

The specific print-controlling program 45 is a program having functions to generate standardized data for printing, which is described in a specific page-descriptive language, and control the communication program 47 to transmit the generated standardized data to, for example, the printing apparatus 1A, the printing apparatus 1C, and the printing apparatus 1D. The specific print-controlling program 45 is one of standard programs provided by the OS 44 to implement the print-controlling function.

Meanwhile, the printing apparatuses 1A, 1C, and 1D have the function to comprehend and rasterize the standardized data described in the specific page-descriptive language, and generate the rasterized data required for printing the image.

The specific print-controlling program 45 is a program designed to run on a variety of printing apparatuses that support the specific page-descriptive language. In other words, as long as the printing apparatus 1 has a functionality to cope with the specific page-descriptive language, the printing apparatus 1 may print an image by the standardized data regardless of a model or a manufacturer of the printing apparatus 1.

Printing systems utilizing the specific print-controlling program 45 may include, for example, AirPrint (registered trademark) and Mopria (registered trademark). The specific page-descriptive language may include, for example, PostScript.

The general print-controlling program 46 is a program having functions to rasterize image data to generate rasterized data, and control the communication program 47 to transmit the generated rasterized data to the printing apparatus 1A or the printing apparatus 1B. The general print-controlling program 46 is a program provided by the OS 44 or by a manufacturer of the printing apparatus 1 to implement the print-controlling function.

In this regard, the printing apparatus 1B may be a generally manufactured printing apparatus, which is capable of printing an image based on the rasterized data. Meanwhile, the general print-controlling program 46 may generate rasterized data, which is in a data format feasible to the printing apparatus 1A.

A printing system utilizing the general print-controlling program 46 may include, for example, Common Unix (trademark) Printing System (CUPS (registered trademark)).

The label image file generated by the image data generating program 42 may be a file adapted to processes to be taken in the specialized print-controlling program 43. The label image file may be transferred from the image-editor application 41 to the specialized print-controlling program 43, with all of the print settings applied in the image-editor application 41 being appended thereto.

Meanwhile, the image-editor application 41 may transfer the image data for the image to be printed to the specific print-controlling program 45 or to the general print-controlling program 46 as well. The specific print-controlling program 45 and the general print-controlling program 46 are programs adapted to processes that are run on the printing apparatuses 1B-1D, which may print images on the sheet-formed printing media. In order to print the image from the image-editor application 41 having the label editing function through the specific print-controlling program 45 or the general print-controlling program 46, the specific print-controlling program 45 or the general print-controlling program 46 may require a generalized image file, which is converted from the label image file into a generalizable format. The image-editor application 41 transferring the generalized image file to the specific print-controlling program 45 or the general print-controlling program 46 may append general print settings to the basic image file. In other words, the image-editor application 41 may not append print settings for the roll-formed printing medium to the basic image file, which is to be transferred to the specific print-controlling program 45 or the general print-controlling program 46, but may append print settings that are feasible to the printing apparatuses 1B-1D.

The communication program 47 is a program having a function to control the network interface 27 to communicate with another communication device. For example, the rasterized data generated in the general print-controlling program 46 may be registered in a spooler in the OS 44. The communication program 47 in the information processing apparatus 2 may transmit the data registered in the spooler to the printing apparatus 1 through the network interface 27. The communication program 47 is another one of the standard programs provided by the OS 44. A part of the communication program 47 may be stored in the ROM 22.

Figure 3:
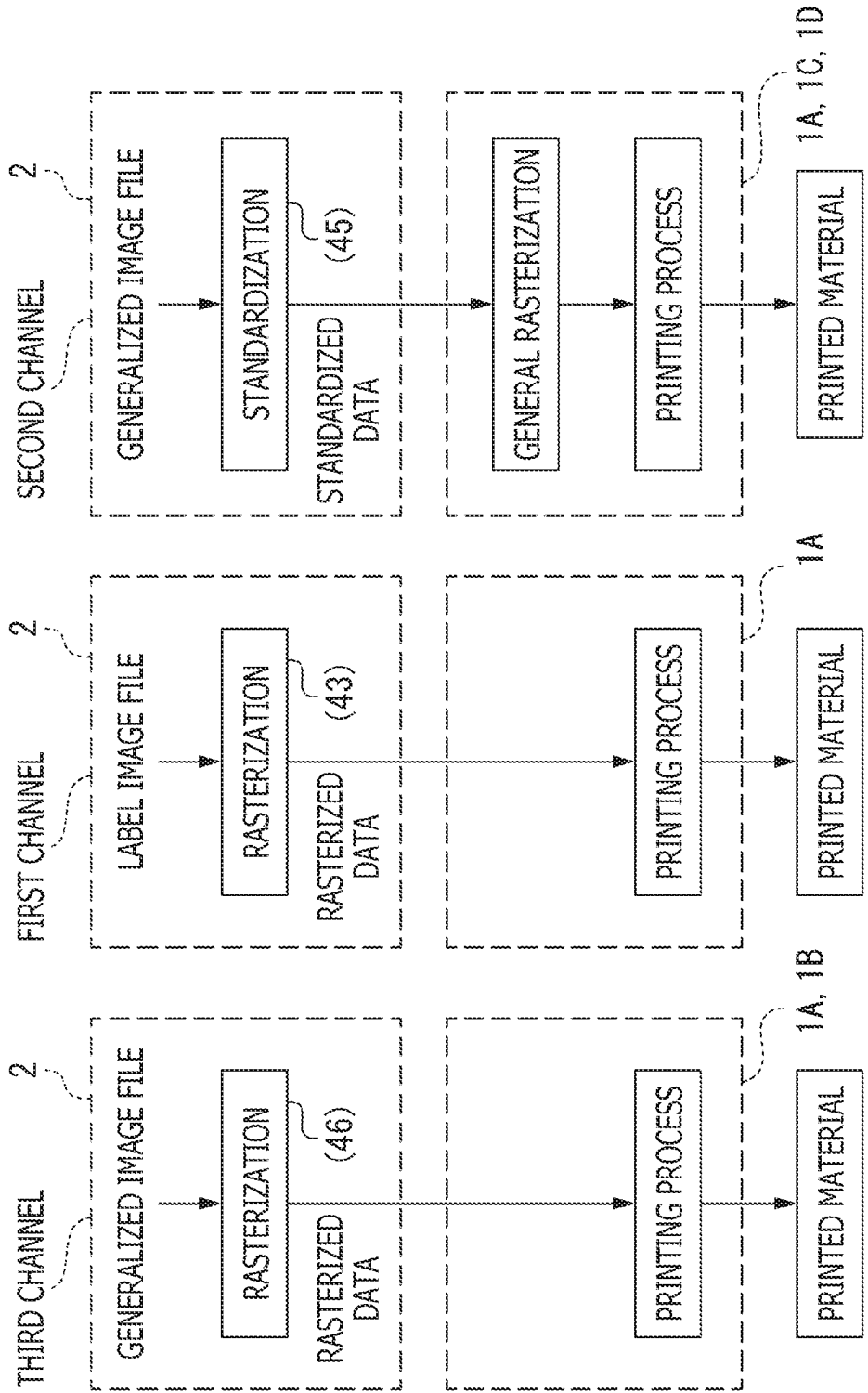
FIG. 3 is a block diagram to illustrate processing channels between the information processing apparatus and the printing apparatus in the printing system according to the embodiment of the present disclosure.

The printing system 100 in the present embodiment may have, as indicated in FIG. 3, three (3) processing channels to process data for commanding the printing apparatus 1 to print an image. The processing channels for processing the data may be called as protocols. The processing channels include a first channel and a third channel, in which the information processing apparatus 2 may rasterize the image data, and a second channel, in which the printing apparatus 1 may rasterize the image data.

In order to control the printing apparatus 1 to print an image through the first channel, the information processing apparatus 2 may, as shown in FIG. 3, rasterize the image data contained in the label image file in a rasterization process according to the specialized print-controlling program 43. The information processing apparatus 2 may transmit the rasterized data to the printing apparatus 1A.

The printing apparatus 1A may receive the rasterized data and print the image based on the rasterized data having been received. Through the first channel, the information processing apparatus 2 rasterizes the image data for the image to be printed by the specialized print-controlling program 43 shown in FIG. 2.

The first channel, which uses the specialized print-controlling program 43, may be therefore feasible to the print settings which are applicable to the printing apparatus 1A, as shown in, for example, FIG. 4.

Applicable options for print setting items feasible to the first channel may be displayed in a print setting screen 61, as shown in FIG. 4, through the operation/display interface 26. The print setting screen 61 may present applicable options for print setting items feasible to the first channel, which include a number of copies 611, numbering 612, cutting option 613, print quality 614, print start 615, halftone 616, brightness/contrast 617, and bidirectional communication 618. The print setting screen 61 further contains a Cancel button 62 and a Done button 63. A print setting item "horizontal flip" 619, which is not feasible to the first channel, is displayed in a gray-out format so that the infeasible print setting "horizontal flip" 619 may not be selected.

In order to control the printing apparatus 1 to print an image through the second channel, the information processing apparatus 2 may, as shown in FIG. 3, describe the image data contained in the generalized image file in the specific page-descriptive language and generate standardized data according to the specific print-controlling program 45. The information processing apparatus 2 may transmit the standardized data to the printing apparatus 1A, 1C, or 1D.

The printing apparatus 1A, 1C, or 1D may receive the standardized data, rasterize the standardized data in a general rasterization process, and print an image based on the rasterized data having been rasterized.

Through the second channel, the data is processed by the specific print-controlling program 45, which is adapted to varieties of models of printing apparatuses. Therefore, print settings acceptable as valid print settings to the specific print-controlling program 45 may be limited to common print settings that are feasible to general printing apparatuses. In this regards, the information processing apparatus 2 may display the print setting items that are feasible to the second channel alone in a print setting screen 71, as shown in FIG. 5.

Applicable options for print setting items feasible to the second channel may be displayed in the print setting screen 71, as shown in FIG. 5. The print setting screen 71 may present applicable options for print setting items feasible to the second channel, which include a number of copies 611, numbering 612, cutting option 613, and horizontal flip 619. The print setting screen 71 further contains the Cancel button 62 and the Done button 63. Print setting items "print quality" 614, "print start" 615, "halftone" 616, "brightness/contrast" 617, and "bidirectional communication" 618, which are not feasible to the second channel, are displayed in the gray-out format so that setting of the options to the infeasible print setting items may be restrained.

In order to control the printing apparatus 1 to print an image through the third channel, the information processing apparatus 2 may, as shown in FIG. 3, rasterize the image data contained in the label image file in a rasterization process according to the general print-controlling program 46. The information processing apparatus 2 may transmit the rasterized data to the printing apparatus 1A or 1B. The printing apparatus 1A or 1B may receive the rasterized data and print an image based on the rasterized data having been received.

The third channel, which uses the general print-controlling program 46, is therefore acceptable of the print settings that are feasible to the printing apparatuses 1A, 1B. For example, print setting options for the print setting items, as shown in, for example, FIG. 6 may be applicable.

Applicable options for print setting items feasible to the third channel may be displayed in a print setting screen 81, as shown in FIG. 6, through the operation/display interface 26. The print setting screen 81 may present applicable options for print setting items feasible to the third channel, which include a number of copies 611, numbering 612, cutting option 613, print quality 614, print start 615, halftone 616, brightness/contrast 617, bidirectional communication 618, and horizontal flip 619. The print setting screen 61 further contains the Cancel button 62 and the Done button 63.

Thus, the first channel, the second channel, and the third channel differ in the subjects to process the image data of the image to be printed. Moreover, the first channel, the second channel, and the third channel may differ in algorisms to rasterize the image data and in outcomes of the rasterization. In other words, in the first channel and the third channel, more advanced or detailed print settings may be applicable to the rasterization, while in the second channel some of the print settings may be limited in the rasterization. Therefore, while images may be printed based on a same label image file, images as printed outcomes through the first channel and the third channel and an image as a printed outcome through the second channel may not be the same but may appear differently.

Next, described in the following paragraphs will be flows of printing actions to be performed in the printing system 100 according to the present embodiment. In particular, the printing actions to be performed through the first channel in the printing system 100 will be described. Meanwhile, among the printing apparatuses 1A-1D, the printing apparatus 1A being a label printer capable of monochrome printing will represent the printing apparatus 1 to be used in the printing actions. The image-editor application 41 serves as a program to generate a label image file for the label printer, and the specialized print-controlling program 43 serves as a program to generate rasterized data feasible to the label printer. During the printing actions through the first channel, the information processing apparatus 2 may accept advanced print settings feasible to the printing apparatus 1A.

Figure 7A:
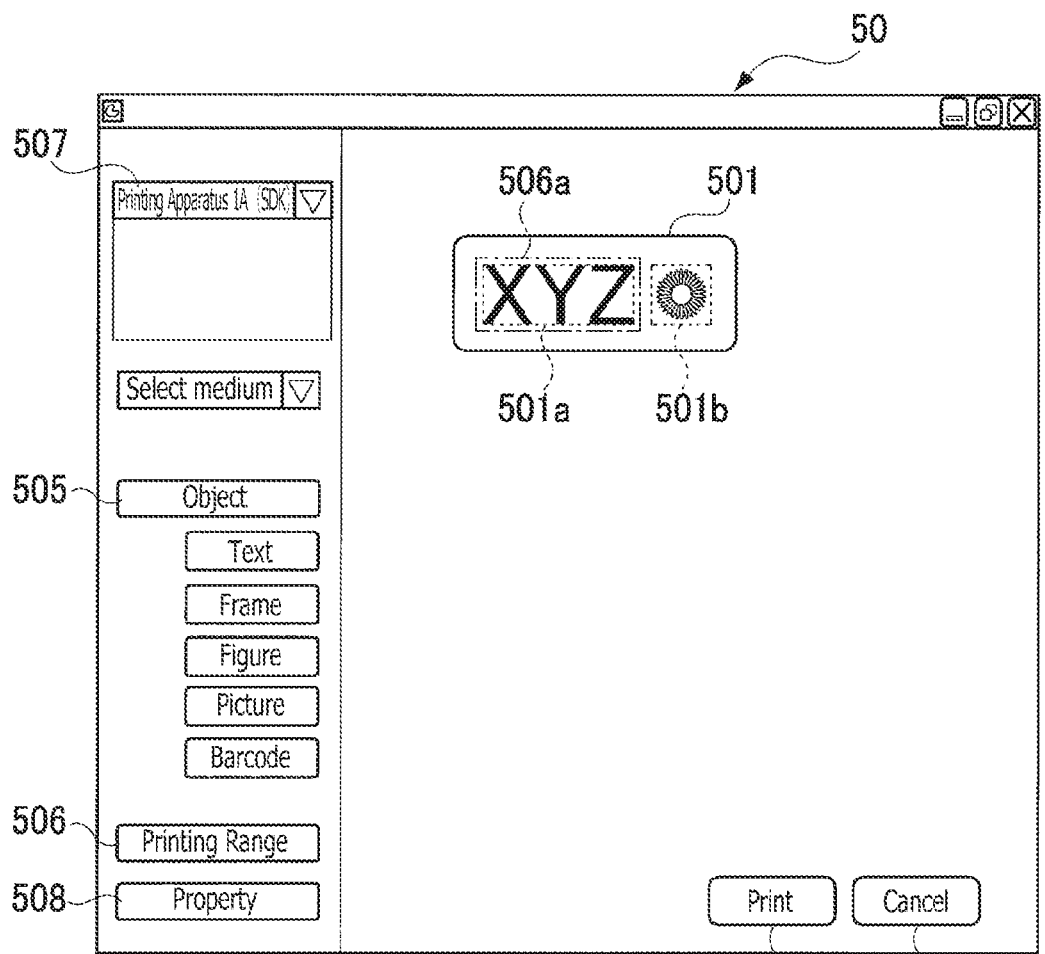
FIG. 7A is an illustrative view of an editor screen to be displayed in the information processing apparatus according to the embodiment of the present disclosure.

In order to create a label in the printing system 100, a user may operate the information processing apparatus 2 to activate the image-editor application 41 and edit a label image file containing image data for the image to be printed. The information processing apparatus 2 activating the image-editor application 41 may display an editor screen 50 as shown in FIG. 7A in the operation/display interface 26.

The editor screen 50 may contain, for example, a preview image 501, which expresses a label image being currently edited, a Print button 502, through which a command to print the label image may be entered, a Cancel button 503, through which actions to edit the label image may be canceled, a printer selector button 507, through which the printing apparatus 1 is selected, and a print setting button 508, through which print settings may be selected.

When the user activates the image-editor application 41 in the information processing apparatus 2, a name of the printing apparatus 1 currently selected is displayed in the printer selector button 507 together with a channel, i.e., a protocol, through which the image data may be processed. For example, if the general print-controlling program 46 for the label printer is installed in the information processing apparatus 2, the user may operate the printer selector button 507 to select the printing apparatus 1A, which may process the image data through the third channel.

Figure 7B:
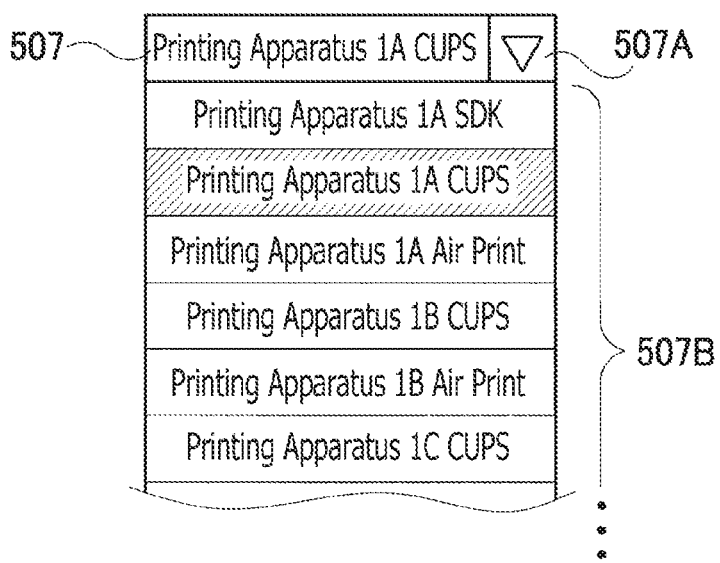
FIG. 7B is a partial enlarged view of the editor screen to be displayed in the information processing apparatus according to the embodiment of the present disclosure.

Specifically, the user may click on a downward arrow 507A (see FIG. 7B) in the printer selector button 507 through a pointing device, such as a mouse (not shown), the information processing apparatus 2 may display a list of the printing apparatuses 1A-1D connected with the information processing apparatus 2 in a pull-down display area 507B along with the respective processing channels. Therefore, the user viewing the list of the printing apparatuses 1A-1D in the pull-down display area 507B may select a desired one of the printing apparatuses 1A-1D through the mouse. FIG. 7B illustrates the printing apparatus 1A with the third channel being selected.

The editor screen 50 may further include, for example, an object selector button 505, as shown in FIG. 7A. Through the object selector button 505, the information processing apparatus 2 may accept a command from the user to designate a type of an object to be added to the label image being currently edited. The type of the object may include, for example, text, frame, figure, picture, and barcode.

The information processing apparatus 2 accepting the command to add an object adds an area to accept the designated object in the preview image 501. Further, the information processing apparatus 2 may accept designation of the image data for the image to be printed and display the image by the designated image data in the added object area in the preview image 501. In FIG. 7A, the preview image 501 including a text object 501a, which contains characters XYZ, and a figure object 501b, which represents a flower, is displayed.

A part of the preview image 501 in the editor screen 50 may be defined as a printing range. The printing range may contain an image to be printed and may be defined by printing conditions, such as a width of a label to be used in the image printing or a size of a printing sheet. The information processing apparatus 2 may display the preview image 501 with indication of the printing range. The information processing apparatus 2 may accept a user's operation to a printing range button 506 to set the range for the image to be printed in the preview image 501. A user may, for example, place an object outside the printing range in the preview image 501 in order to, for example, efficiently create a label image. In such a case, by limiting the printable area in the preview image 501, the object, which should not be printed, may be excluded from the printing range and prevented from being printed undesirably. In the preview image 501 shown in FIG. 7A, a printing range 506a containing a text object 501a and excluding a figure image 501, is indicated by a dash-and-dot line.

The image-editor application 41 in the present embodiment may, in response to a print setting command entered by the user operating the print setting button 508, display one of the print setting screens 61, 71, and 81 as shown in FIGS. 4, 5, and 6, corresponding to the first, second, and third channel, respectively, selected through the printer selector button 507.

The Cancel button 62 may be operated in order to cancel operations to the print setting screens 61, 71, 81 and return to the editor screen 50 (see FIG. 7A). The Done button 63 may be operated in order to enter and validate the print setting options selected through the print setting screens 61, 71, 81 and the operation/display interface 26 may return to the editor screen 50 shown in FIG. 7A.

The information processing apparatus 2 may accept a user's operation to the Print button 502 in the editor screen 50. In response, the information processing apparatus 2 may process the image data for the image to be printed through one of the first, second, and third channels and output data to command for printing the image to the printing apparatus 1 selected through the editor screen 50. In the present embodiment, while the printing apparatus 1A with the first channel to process the image data is selected in the editor screen 50 (see FIG. 7A), the information processing apparatus 2 may output the data through the first channel for commanding the printing apparatus 1A to print the image to the printing apparatus 1A.

When the Print button 502 in the editor screen 50 (see FIG. 7A) is operated, the information processing apparatus 2 may create a record of print history information 442 in a queue file 441 (see FIG. 8), which is created by the OS 44 for each of the first, second, and third channels, i.e., on the protocol basis, and for each of the printing apparatuses 1A, 1B, 1C, 1D.

For example, in the present embodiment, the printing apparatus 1A to process the image data through the first channel is selected through the editor screen 50 (see FIG. 7A). Therefore, the information processing apparatus 2 may add a record of the print history information 442 in the queue file 441 for a print queue, which is created specifically for the print jobs designating the printing apparatus 1A using the first channel.

For another example, when the non-volatile memory 24 is divided into partitions, and when the OS 44A installed in one of the partitions is currently running active, the information processing apparatus 2 may create a record of the print history information 442 in the queue file 441 for a print queue, which is created on the protocol basis, i.e., for each of the first, second, and third channels, for each printing apparatus 1.

The queue file 441 in the non-volatile memory 24, as shown in FIG. 8A, may contain a record of the print history information 442, which includes a name of an image-editor application, a file name, a name of the printing apparatus (device name), a processing channel (protocol), print setting information, a date of printing, and a communication interface to be used, for each print job in the print queue. For example, for a print job that is to be processed through the third channel and printed by the printing apparatus 1A, the name of the printing apparatus 1A, information indicating the third channel, and setting information for each print setting item applicable through the print setting screen 81 (se FIG. 6) are added in the queue file 441 as a device name, a protocol, and print setting information, respectively. The device name may include information concerning a model of the device.

The queue file 441 is administrated by the OS 44; therefore, records in the print history information 442 in the queue file 441 may not be limited to records of print jobs that are output from the image-editor application 41 but may include records of print jobs that are output from another application.

The queue file 441 for the print queue is created for each of the printing apparatuses 1A-1D on the processing channel basis, i.e., for each of the first, second, and third processing channels. The queue files 441 are stored in the non-volatile memory 24 and administrated by the OS 44.

Optionally, the queue files 441 for print queues may be stored in external devices outside the printing apparatuses 1A-1D. In other words, the printing apparatuses 1A-1D may each be connected with an external device such as a printer server, a USB memory, or a removable hard disk through a network, and the controllers 11 in the printing apparatuses 1A-1D may store the print history information 442 in the respective queue files 441 stored in the external device.

Moreover, the information processing apparatus 2 may create records of print history information 412 in a print history file 411, which is prepared and administrated by the image-editor application 41. As shown in FIG. 8B, the print history file 411 in the non-volatile memory 24 includes records of the print history information 412, each of which includes a file name, a name of the printing apparatus (device name), a processing channel (protocol), print setting information, a date of printing, and a communication interface to be used, for each print job.

Figure 9A:
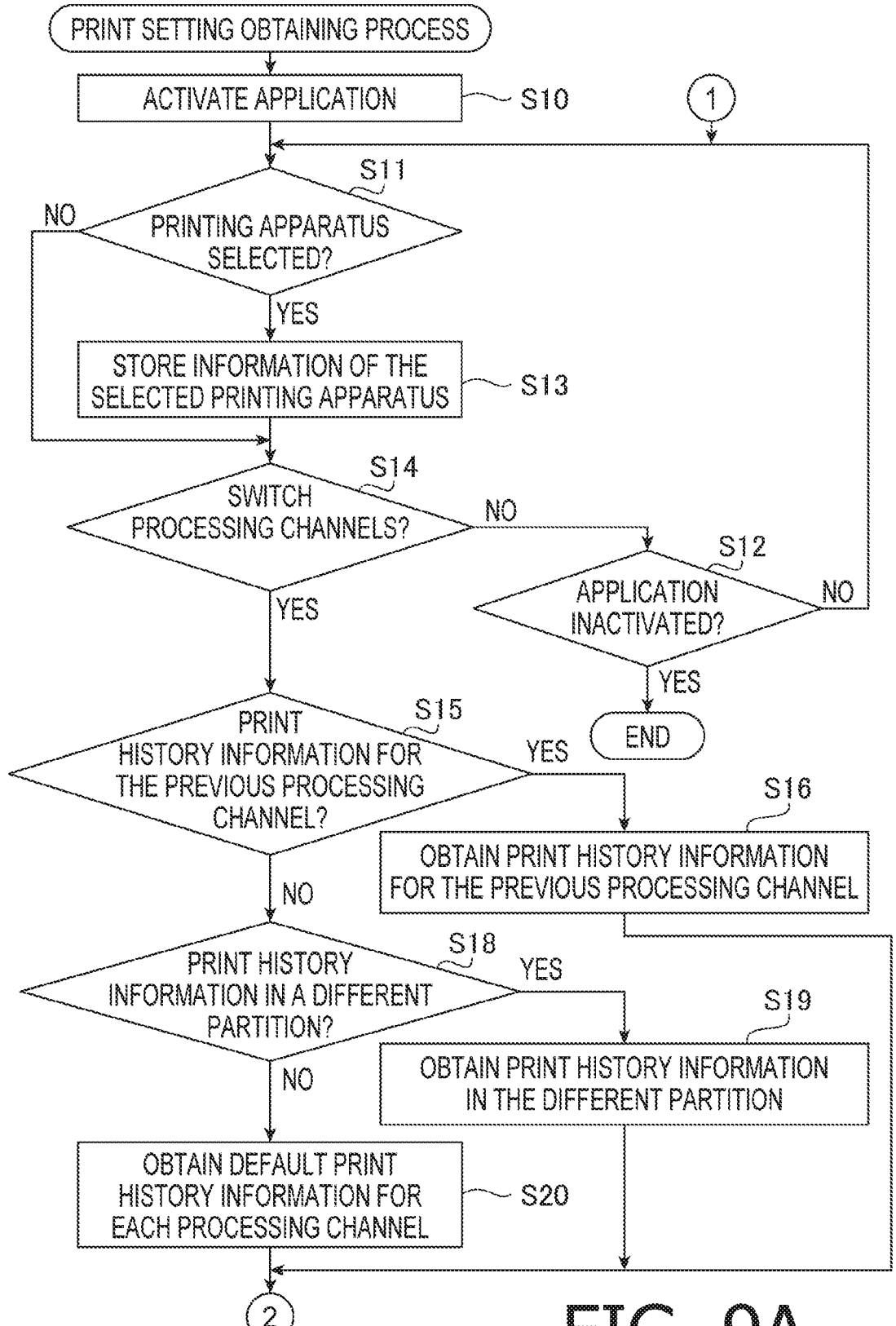
FIGS. 9A-9B are a flowchart to illustrate flows of steps in a print setting obtaining process in the information processing apparatus according to the embodiment of the present disclosure.
Figure 9B:
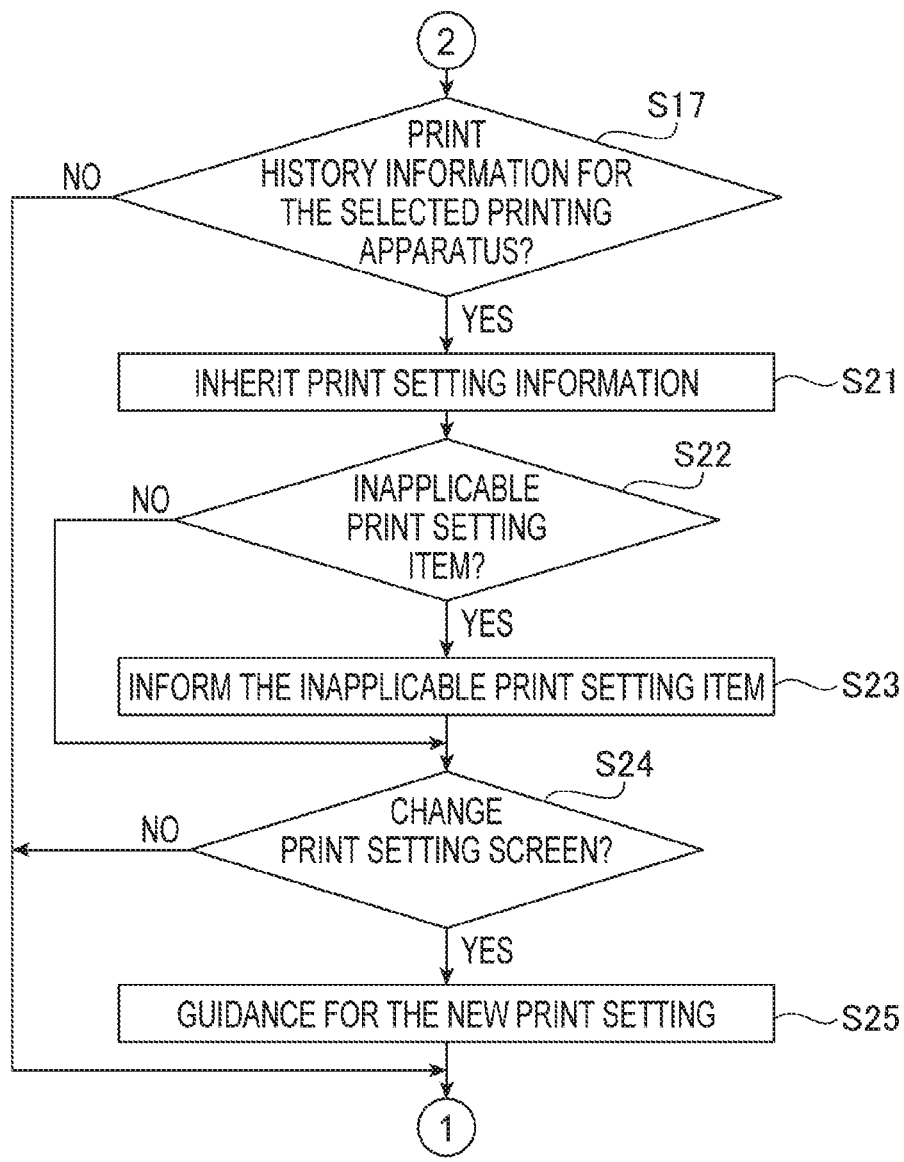

Next, with reference to FIGS. 9A-9B, described below will be a print setting obtaining process to be executed in the information processing apparatus 2 in order to set print setting values automatically in the printing system 100. The print setting obtaining process may be executed by the CPU 21 in the information processing apparatus 2 in response to the user's operation to activate the image-editor application 41 through the operation/display interface 26 while the information processing apparatus 2 is powered. The print setting obtaining process is one of processes to be executed by the image-editor application 41.

In the print setting obtaining process, first, in S10, the CPU 21 activates the image-editor application 41.

In S11, the CPU 21 determines whether a new printing apparatus 1 and/or a new processing channel therefor, which is new to the information processing apparatus 2, is selected. Specifically, the CPU 21 determines that a printing apparatus 1 with a processing channel, at least one of which is new to the information processing apparatus 2, is selected based on the user's operation to the printer selector button 507. For example, if the user selects to switch the processing channels from the third channel (CUPS) to the first channel (specialized application) while the user' selection to the printing apparatus 1 remains the same, the CPU 21 may determine that a new printing apparatus 1 and/or a new processing channel therefor, which is new to the information processing apparatus 2, is selected in S11. For another example, when the user selects to switch the printing apparatus 1 from the printing apparatus 1B to the printing apparatus 1A while the user's selection to the processing channel remains the same, the CPU 21 may determine that a new printing apparatus 1 and/or a new processing channel therefor, which is new to the information processing apparatus 2, is selected in S11.

The user may select to switch the processing channels while the selection for the printing apparatus 1 remains the same when, for example, the OS 44 is updated. After being updated, the OS 44 may no longer support the general print-controlling program 46, which was previously supported in the earlier version of the OS 44. In such a case, the print job may no longer be processed through the third channel. Accordingly, the information processing apparatus 2 may need to select either the first channel or the second channel, while the selection to the printing apparatus 1 may remain the same.

In S11, if the CPU 21 determines that no new printing apparatus 1 or processing channel is selected (S11: NO), the flow proceeds to S14. Meanwhile, although detailed steps are omitted from the flowchart in FIGS. 9A-9B, if an operation other than the selecting operation for the printing apparatus 1, such as, for example, a command to start printing, is entered, the CPU 21 may start a process corresponding to the entered operation.

In S11, on the other hand, if the CPU 21 determines that a new printing apparatus 1 and/or a new processing channel is selected (S11: YES), the flow proceeds to S13, and the CPU 21 stores information concerning the printing apparatus 1 and the processing channel, at least one of which is new to the information processing apparatus 2, in the non-volatile memory 24.

In S14, the CPU 21 determines whether the selection of the printing apparatus 1 in S11 requires switching of the processing channels. If the CPU 21 determines that the selection of the printing apparatus 1 does not require switching of the processing channels (S14: NO), the flow proceeds to S12, and the CPU 21 determines whether the image-editor application 41 is inactivated. If the CPU 21 determines that the image-editor application 41 is inactivated (S12: YES), the print setting obtaining process ends thereat. In S12, on the other hand, if the CPU 21 determines that the image-editor application 41 is running active (S12: NO), the flow returns to S11.

Thus, according to the present embodiment, when the printing apparatus 1 to be used is switched from one of the printing apparatuses 1A-1D to another of the printing apparatuses 1A-1D, while the processing channel being one of the first, second, and third channels remains the same, in S14, the CPU 21 determines that usage of the printing apparatus 1 does not require switching of the processing channels (S14: NO). Therefore, without switching the processing channels, the print setting information for the processing channel used in a previous print job is inherited to the current print job.

Meanwhile, in S14, if the CPU 21 determines that the processing channels should be switched from one to another (S14: YES), the flow proceeds to S15, and the CPU 15 determines whether the queue file 441 corresponding to the processing channel used in the previous print job contains a record of print history information 442.

For example, a previous print job may have been processed through the third channel and output to be printed in the printing apparatus 1A. In the current print job, if the user selects to continuously use the printing apparatus 1A but selects to use the first channel, in S15, the CPU 21 determines whether the queue file 441 created for the third channel, which was used in the previous print job, contains a record of print history information 442.

For another example, when the OS 44 is updated, the updated OS 44 may no longer support the general print-controlling program 46. In such a case, the processing channels may be automatically switched from the third channel to the first channel Therefore, CPU 21 may determine that the processing channels should be switched from the third channel to the first channel in S14 (S14: YES), and in S15, the CPU 21 determines whether the queue file 441 corresponding to the third channel, which was used in the previous print job, contains a record of print history information 442.

In S15, if the CPU 21 determines that the queue file 441 corresponding to the processing channel used in the previous print job contains a record of print history information 442 (S15: YES), in S16, the CPU 21 obtains the record of print history information 442 from the queue file 441, and the flow proceeds to S17.

Optionally, the steps in S15 and S16 may be conducted by the controller 11 in the printing apparatus 1 through the network. In other words, the queue files 441 may be stored in an external device, such as a print server, a USB memory, and a removable hard disk, and the controller 11 in the printing apparatus 1 may determine whether the queue file 441 in the external device corresponding to the processing channel used for the previous print job contains a record of print history information 442 and obtain the record of print history information 442 from the queue file 441 in the external device. Moreover, the steps in S15 and S16 may be conducted with reference to the print history information 412 stored in the print history file 411 administrated by the image-editor application 41.

Meanwhile, in S15, if the CPU 21 determines that no record of print history information 442 is contained in the queue file 441 corresponding to the processing channel used in the previous print job (S15: NO), in S18, the CPU 21 determines whether any queue file 441 for print queues administrated by the OS 44A installed in any other one of the partitions in the non-volatile memory 24 corresponding to the processing channel used for the previous print job contains a record of print history information 442.

In S18, if the CPU 21 determines that a queue file 441 for a print queue administrated by the OS 44A installed in another one of the partitions in the non-volatile memory 24, which corresponds to the processing channel used for the previous print job, contains a record of print history information 442 (S18: YES), in S19, the CPU 21 obtains the record of print history information 442 from the queue file 441 for the print queue administrated by the OS 44A installed in the another one of the partitions in the non-volatile memory 24. The flow proceeds to S17.

In S18, on the other hand, if the CPU 21 determines that no queue file 441 for a print queue administrated by the OS 44A installed in any other one of the partitions in the non-volatile memory 24 contains a record of print history information 442 (S18: NO), in S20, the CPU 21 obtains default print history information prepared for each of the processing channels: the first, second, and third channels.

In S17, the CPU 21 searches through the print history information 442 obtained in S16, S19, or S20 and determines whether the print history information 442 contains a record including a name of the printing apparatus 1 which is the same as the name of the printing apparatus 1 stored in S13. If the CPU 21 determines that no print history information 442 obtained in S16, S19, or S20 contains a record including the name of the printing apparatus 1 which is the same as the name of the printing apparatus 1 stored in S13 (S17: NO), the flow returns to S11.

In S17, on the other hand, if the CPU 21 determines that the print history information 442 obtained in S16, S19, or S20 contains a record including the name of the printing apparatus 1 which is the same as the name of the printing apparatus 1 stored in S13 (S17: YES), In S21, the CPU 21 extracts the print setting information from the print history information 442 and writes the extracted print setting information over the print setting information for the printing apparatus 1 in S13 as initial setting values for the currently running active image-editor application 41. In other words, the print setting screen 61 (FIG. 4), 71 (FIG. 5), or 81 (FIG. 6) with the initial setting values embedded therein are displayed through the operation/display interface 26, and the user viewing the print setting screen 61 (FIG. 4), 71 (FIG. 5), or 81 (FIG. 6) may recognize the print setting values, which are automatically set for the current print job, before the user operates the print setting screen 61, 71, or 81.

For example, a previous print job may have been processed through the third channel and output to be printed in the printing apparatus 1A. In the current print job, if the user selects to continuously use the printing apparatus 1A but selects to use the first channel, the print setting information having been set for the third channel in the previous print job may be inherited as the print setting information for the first channel and may be displayed in the print setting screen 61 (see FIG. 4). Therefore, the user viewing the print setting screen 61 may recognize that the print setting values for the previously used third channel are set automatically to the current print job using the first channel.

Thus, if the processing channels are switched from the third channel to the first channel, and if the user selects to continuously use the same printing apparatus 1A, the printing apparatus 1A to be used stays unchanged. In this regard, the print setting values before switching the processing channels may be preferable to the user, and the user may wish to continue using the print setting values after switching the processing channels. Therefore, the information processing apparatus 2 may obtain the print history information 442 recorded in the previous print job for the selected printing apparatus 1A with use of the third channel, and based on the previous print setting information stored as the print history information 442, the information processing apparatus 2 may set the print setting information for the selected first channel. Thus, the print setting values for the selected printing apparatus 1A may be preferably and automatically set and used.

For another example, after updating the OS 44, the updated version of the OS 44 may no longer support the general print-controlling program 46. In such a case, the processing channels may be switched, for example, from the third channel to the first channel, automatically. The information processing apparatus 2 may obtain the print history information 442 used for the previous print job in the selected printing apparatus 1A with use of the third channel and set the print setting information for the first channel based on the past print setting information indicated in the obtained print history information 442. Thus, the print setting values for the selected printing apparatus 1A may be set to be used preferably and automatically.

Thereby, the information processing apparatus 2, receiving a command to set print settings from the user who operates the print setting button 508, may display the print setting screen 61, which includes the print setting values provided as the initial setting values, through the operation/display interface 26. Therefore, the user may use the print settings values which are the same as the print setting values used before the processing channels were switched. In this regard, some operations for the user to set the print setting values may be omitted, and usability of the printing system 100 may be improved.

Optionally, in S17, the CPU 21 may not necessarily determine whether the print history information 442 containing the same name of the printing apparatus 1 as the name of the printing apparatus 1 saved in S13 exists. Alternatively, for example, in S17, the CPU 21 may determine whether the print history information 442 containing a name of the printing apparatus 1 similar to the name of the printing apparatus 1 saved in S13 exists. Based on this determination, in S21, the CPU 21 may extract the print setting information from the print history information 442 that contains the similar name of the printing apparatus 1 and write the extracted print setting information as the initial setting values for the image-editor application 41 over the print setting values for the printing apparatus 1 saved in S13.

The information concerning the similarity between the names of the printing apparatuses 1 may be, for example, stored in a table in the image-editor application 41, or, for another example, stored in a server of a manufacturer of the printing apparatuses 1 and referred to by the CPU 21 through the internet.

Meanwhile, in S21, the CPU 21 may find multiple records of print history information 442. In such a case, the CPU 21 may extract the print setting information from the latest record of the print history information 442 based on the date of printing and write the extracted print setting information as the initial setting values for the image-editor application 41 over the print setting values for the printing apparatus 1 saved in S13. Alternatively, the CPU 21 may extract the print setting information from the most frequently used print setting information from the multiple records of the print history information 442.

Following S21, the flow proceeds to S22. In S22, the CPU 21 determines whether any of the print setting items is no longer applicable. If the CPU 21 determines one or more print setting items is no longer applicable to the print job to be processed through the selected processing channel (S22: YES), in S23, the CPU 21 informs the user of the inapplicability of the print setting item(s).

In particular, the information processing apparatus 2 stores the print setting items that are applicable to each of the first, second, and third channels in the non-volatile memory 24. Therefore, if the processing channels are switched from one to another, the CPU 21 refers to the stored information and determines in S22 whether the print setting items are still applicable or any of the print setting items are no longer applicable.

For example, if the user selects to use the same printing apparatus 1A continuously but selects to change the processing channels from the third channel to the second channel, some of the print setting items are inapplicable to the print job to be processed through the second channel. In other words, a number of applicable print setting items is reduced. More specifically, the setting items that are displayed in the gray-out format in the print setting screen 71 shown in FIG. 5 are inapplicable. Therefore, the CPU 21 informs the user of the inapplicability of the inapplicable print setting items, and the user may be aware of the print setting items that are applicable or inapplicable with the newly selected processing channel efficiently. In other words, usability of the printing system 100 may be improved.

The inapplicability of some of the print setting items may be informed to the user by, for example, the gray-out indication of the inapplicable print setting items in the print setting screen 71 as shown in FIG. 5. For another example, the inapplicability may be informed by not displaying the inapplicable print setting items in the print setting screen 71, or by displaying a message or playing audio guidance through the operation/display interface 26 when the user attempts to select the inapplicable print setting. For another example, if an alternative print setting to replace the inapplicable print setting is available, the user may be guided to the alternative print setting and helped to set the alternative print setting.

In S22, on the other hand, if the CPU 21 determines that there are no inapplicable print setting item (S22: NO), the flow proceeds to S24.

In S24, the CPU 21 determines whether the print setting screen to be displayed should be changed to another print setting screen corresponding to the selected processing channel. If the print setting screen should not be changed (S24: NO), the flow returns to S11.

In S24, on the other hand, if the CPU 21 determines that the print setting screen should be changed to the print setting screen corresponding to the selected processing channel (S24: YES), in S25, the CPU 21 provides the user with tutorial how to use the new print settings that are included in the replacing print setting screen. The flow returns to S11.

For example, if the user selects to use the same printing apparatus 1A continuously but selects to change the processing channels from the third channel to the second channel, an appearance of the print setting screen corresponding to the second channel may be different from the appearance of the print setting screen corresponding to the third channel. Moreover, modes or procedure to set some of the print settings may be different between the print setting screens corresponding to the third channel and the second channel. In this regard, description or guidance to teach how to use the print settings that are applicable through the new print setting screen may be provided so that the user may select to apply the print setting options that are available in the newly selected processing channel. Therefore, usability of the printing system 100 may be improved.

Optionally, if the newly selected processing channel provides other setting options that are similar or equivalent to the print setting options, which were applicable in the previous processing channel, the replacing print setting screen may inform the user of availability of the similar or equivalent print setting options and provide tutorial to the similar or equivalent print setting options.

For example, when the processing channels are switched from the third channel to the second channel, as shown in the print setting screen 71 (see FIG. 5), the print setting item "brightness/contrast" 617 is not applicable to the print job to be processed through the second channel. Meanwhile, degrees of brightness and contrast in the label image may be adjustable through an image adjusting function in the image-editor application 41. Therefore, explanation of a method how to use the image-editor application 41 or tutorial concerning the image-editor application 41 may be provided to the user through the operation/display interface 26. The guidance or the tutorial may be visually displayed or audibly played through the operation/display interface 26.

Although an example of carrying out the invention has been described, those skilled in the art will appreciate that there are numerous variations and permutations of the program to be run in the information processing apparatus that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, the printing apparatus 1 may not necessarily be equipped with the operation panel 13. For another example, the memory medium in the information processing apparatus 2 may not necessarily be limited to the non-volatile memory 24 but may be any type of mass storage memory device.

For another example, the communication method between the printing apparatus 1 and the information processing apparatus 2 may not necessarily be limited to the wireless communication in compliance with the Wi-Fi standard but may be, for example, wired communication through a USB cable, or wireless communication in compliance with Bluetooth (registered trademark). Further, the printing apparatus 1 and the information processing apparatus 2 may be adapted to a plurality of communication methods.

For another example, the image file for the image to be printed may not necessarily be limited to the label image file for printing a label on a tape. For example, the image file may be a compressed file including a PDF file, a JPEG file, etc., or may be a bitmap file. When the image file other than the label image file is used, an application program and a print-controlling program that may handle the image data equivalently to the image-editor application 41 and the specialized print-controlling program 43 may be adopted.

For another example, in S23 in the print setting obtaining process, print setting items that are added for the new processing channel, in addition to or in place of the print setting items that are inapplicable with the new processing channel, may be informed to the user. For example, if the user selects to use the same printing apparatus 1A continuously but selects to change the processing channels from the second channel to the first channel, a number of the print setting items may increase. Therefore, the print setting items that are newly applicable may be informed to the user.

For another example, the print setting values may not necessarily be set automatically each time when the processing channels are changed. The CPU 21 may determine whether the current print job is a first print job after the latest upgrade of the OS 44, and if the current print job is determined to be the first print job, the CPU 21 may inherit the print setting values from the print history information 442 recorded in the past print job as the initial setting values for the current print job.

For another example, the steps or the processes in the print setting obtaining process described above may be accomplished by a single CPU, a plurality of CPUs, a hardware device such as an ASIC, or a combination of any of these. For another example, the steps or the processes in the above-described embodiment may be accomplished by various media or methods, including a recording medium storing the programs to implement the steps or the processes.

What is claimed is:

1. A non-transitory computer readable storage medium storing computer readable instructions that are executable by a computer in an information processing apparatus, the information processing apparatus comprising a communication interface, through which the information processing apparatus is connected with a printer, the information processing apparatus being configured to, in response to receiving through the communication interface a command that causes the printer to print an image, conduct a print control, the print control comprising a first print control, in which printing of the image is processed through a first channel, and a second print control, in which printing of the image is processed through a second channel different from the first channel, the computer readable instructions, when executed by the computer, causing the computer to:

accept a selection for the printer;

determine whether the print control is to be switched from the first print control to the second print control based on the selection for the printer;

based on a determination that the print control is to be switched from the first print control to the second print control, obtain history of the first print control conducted in past in the selected printer; and based on the obtained history of the first print control, set a print setting value for the second print control to be conducted in the selected printer, wherein one of the first channel and the second channel is a channel to process image data for the image to be printed by the printer through a first rasterization process, and wherein the other of the first channel and the second channel is a channel to process the image data for the image to be printed by the printer through a second rasterization process, the second rasterization process being different from the first rasterization process.

2. The non-transitory computer readable storage medium according to claim 1, wherein the history of the first print control is stored in a print queue administrated by an operating system installed in the information processing apparatus and obtained from the operating system.

3. The non-transitory computer readable storage medium according to claim 1, wherein, in response to causing the printer to print the image, the computer readable instructions cause the computer to store information identifying the print control used in the printing of the image in association with the print setting value used in the printing of the image in a file prepared in the non-transitory computer readable storage medium storing the computer readable instructions; and wherein the computer readable instructions cause the computer to read and obtain the print setting value stored in association with the first print control in the file as the history of the first print control.

4. The non-transitory computer readable storage medium according to claim 1, wherein the information processing apparatus comprises a non-volatile memory comprising a plurality of partitions, in each of which an operating system is installed, the operating system in each of the plurality of partitions comprising a print queue; and wherein, in a case where the computer fails to obtain the history of the first print control from the operating system currently running active in one of the plurality of partitions, the computer readable instructions cause the computer to obtain history of the first print control conducted in the past in the selected printer from the print queue in the operating system installed in another one of the plurality of partitions in the non-volatile memory.

5. The non-transitory computer readable storage medium according to claim 1, wherein, in a case where the first print control is inapplicable to the printing of the image in the selected printer, the computer readable instructions cause the computer to switch the print control from the first print control to the second print control and determine that the print control is to be switched from the first print control to the second print control.

6. The non-transitory computer readable storage medium according to claim 1, wherein the information processing apparatus comprises a user interface; and wherein, in response to receiving a command for switching the print control from the first print control to the second print control through the user interface, the computer readable instructions cause the computer to switch the print control from the first print control to the second print control and determine that the print control is to be switched from the first print control to the second print control.

7. The non-transitory computer readable storage medium according to claim 1,
wherein, based on the determination that the print control is to be switched from the first print control to the second print control, the computer readable instructions cause the computer to further determine whether the print setting value for the first print control includes a setting option that is inapplicable for the second print control; and
wherein, based on a determination that the print setting value for the first print control includes the setting option that is inapplicable for the second print control, the computer readable instructions cause the computer to output notification concerning inapplicability of the setting option for the second print control.

8. The non-transitory computer readable storage medium according to claim 1,
wherein, in a case where the computer fails to obtain the history of the first print control conducted in the past in the selected printer, the computer readable instructions cause the computer to search for another printer similar to the selected printer; and
in a case where the computer finds the another printer similar to the selected printer, the computer readable instructions cause the computer to obtain history of the first print control conducted in past in the another printer in place of the history of the first print control conducted in the past in the selected printer.

9. The non-transitory computer readable storage medium according to claim 1,
wherein, in response to causing the printer to print the image, the computer readable instructions cause the computer to transmit a record, in which information to identify one of the first print control and the second print control used in the printing of the image is associated with the print setting value used in the printing of the image, to an external device through the communication interface; and
wherein the computer readable instructions cause the computer to receive a record containing information concerning the first print control conducted in the past from the external device and obtain the print setting value stored in the received record as the history of the print control conducted in the past in the selected printer.

10. The non-transitory computer readable storage medium according to claim 1,
wherein the information processing apparatus comprises a user interface;
wherein the computer readable instructions cause the computer to display through the user interface a setting screen, in which the print setting value for the printing of the image in the selected printer is displayed, based on the print control to be conducted;
wherein, based on the determination that the print control is to be switched from the first print control to the second print control, the computer readable instructions cause the computer to further determine whether a mode to set the print setting value through the setting screen for the second print control is different from a mode to set the print setting value through the setting screen for the first print control; and
wherein, based on a determination that the mode to set the print setting value through the setting screen for the second print control is different from the mode to set the print setting value through the setting screen for the first print control, the computer readable instructions cause the computer to output notification through the user interface concerning the mode to set the print setting value through the setting screen for the second print control.

11. The non-transitory computer readable storage medium according to claim 1,
wherein the information processing apparatus comprises a user interface;
wherein the computer readable instructions cause the computer to display through the user interface an editor screen, through which image data of the image to be printed is editable;
wherein, based on a determination that the print setting value for the first print control includes a setting option that is inapplicable for the second print control when it is determined that the print control is to be switched from the first print control to the second print control, the computer readable instructions cause the computer to further determine whether an image, in which the setting option inapplicable for the second print control is achievable through editing, is producible; and
wherein, based on a determination that the image, in which the setting option inapplicable for the second print control is achievable through editing, is producible, the computer readable instructions cause the computer to output information concerning a method to edit the image data through the editor screen.

12. The non-transitory computer readable storage medium according to claim 1,
wherein, in the first rasterization process, the computer readable instructions cause the information processing apparatus to rasterize image data for the image to be printed; and
wherein, in the second rasterization process, the computer readable instructions cause the printer to rasterize the image data.

13. A non-transitory computer readable storage medium storing computer readable instructions that are executable by a computer in an information processing apparatus, the information processing apparatus comprising a communication interface, through which the information processing apparatus is connected with a printer, the information processing apparatus being configured to, in response to receiving through the communication interface a command that causes the printer to print an image, conduct a print control, the print control comprising a first print control, in which printing of the image is processed through a first channel, and a second print control, in which printing of the image is processed through a second channel different from the first channel, the computer readable instructions, when executed by the computer, causing the computer to:
accept a selection for the printer;
determine whether the print control is to be switched from the first print control to the second print control based on the selection for the printer;
based on a determination that the print control is to be switched from the first print control to the second print control, obtain history of the first print control conducted in past in the selected printer; and
based on the obtained history of the first print control, set a print setting value for the second print control to be conducted in the selected printer,
wherein, in response to causing the printer to print the image, the computer readable instructions cause the computer to transmit a record, in which information to identify one of the first print control and the second print control used in the printing of the image is associated with the print setting value used in the printing of the image, to an external device through the communication interface; and wherein the computer readable instructions cause the computer to receive a record containing information concerning the first print control conducted in the past from the external device and obtain the print setting value stored in the received record as the history of the print control conducted in the past in the selected printer.

14. A non-transitory computer readable storage medium storing computer readable instructions that are executable by a computer in an information processing apparatus, the information processing apparatus comprising a communication interface, through which the information processing apparatus is connected with a printer, the information processing apparatus being configured to, in response to receiving through the communication interface a command that causes the printer to print an image, conduct a print control, the print control comprising a first print control, in which printing of the image is processed through a first channel, and a second print control, in which printing of the image is processed through a second channel different from the first channel, the computer readable instructions, when executed by the computer, causing the computer to:

accept a selection for the printer;

determine whether the print control is to be switched from the first print control to the second print control based on the selection for the printer;

based on a determination that the print control is to be switched from the first print control to the second print control, obtain history of the first print control conducted in past in the selected printer; and based on the obtained history of the first print control, set a print setting value for the second print control to be conducted in the selected printer, wherein the information processing apparatus comprises a user interface;

wherein the computer readable instructions cause the computer to display through the user interface a setting screen, in which the print setting value for the printing of the image in the selected printer is displayed, based on the print control to be conducted;

wherein, based on the determination that the print control is to be switched from the first print control to the second print control, the computer readable instructions cause the computer to further determine whether a mode to set the print setting value through the setting screen for the second print control is different from a mode to set the print setting value through the setting screen for the first print control; and wherein, based on a determination that the mode to set the print setting value through the setting screen for the second print control is different from the mode to set the print setting value through the setting screen for the first print control, the computer readable instructions cause the computer to output notification through the user interface concerning the mode to set the print setting value through the setting screen for the second print control.

15. A non-transitory computer readable storage medium storing computer readable instructions that are executable by a computer in an information processing apparatus, the information processing apparatus comprising a communication interface, through which the information processing apparatus is connected with a printer, the information processing apparatus being configured to, in response to receiving through the communication interface a command that causes the printer to print an image, conduct a print control, the print control comprising a first print control, in which printing of the image is processed through a first channel, and a second print control, in which printing of the image is processed through a second channel different from the first channel, the computer readable instructions, when executed by the computer, causing the computer to:

accept a selection for the printer;

determine whether the print control is to be switched from the first print control to the second print control based on the selection for the printer;

based on a determination that the print control is to be switched from the first print control to the second print control, obtain history of the first print control conducted in past in the selected printer; and based on the obtained history of the first print control, set a print setting value for the second print control to be conducted in the selected printer, wherein, based on the determination that the print control is to be switched from the first print control to the second print control, the computer readable instructions cause the computer to further determine whether the print setting value for the first print control includes a setting option that is inapplicable for the second print control;

wherein, based on a determination that the print setting value for the first print control includes the setting option that is inapplicable for the second print control, the computer readable instructions cause the computer to output notification concerning inapplicability of the setting option for the second print control, wherein the information processing apparatus comprises a user interface;

wherein the computer readable instructions cause the computer to display through the user interface an editor screen, through which image data of the image to be printed is editable;

wherein, based on the determination that the print setting value for the first print control includes the setting option that is inapplicable for the second print control, the computer readable instructions cause the computer to further determine whether an image, in which the setting option inapplicable for the second print control is achievable through editing, is producible; and wherein, based on a determination that the image, in which the setting option inapplicable for the second print control is achievable through editing, is producible, the computer readable instructions cause the computer to output information concerning a method to edit the image data through the editor screen.

16. A non-transitory computer readable storage medium storing computer readable instructions that are executable by a computer in an information processing apparatus, the information processing apparatus comprising a communication interface, through which the information processing apparatus is connected with a printer, the information processing apparatus being configured to, in response to receiving through the communication interface a command that causes the printer to print an image, conduct a print control, the print control comprising a first print control, in which printing of the image is processed through a first channel, and a second print control, in which printing of the image is processed through a second channel different from the first channel, the computer readable instructions, when executed by the computer, causing the computer to:
- accept a selection for the printer;
- determine whether the print control is to be switched from the first print control to the second print control based on the selection for the printer;
- based on a determination that the print control is to be switched from the first print control to the second print control, obtain history of the first print control conducted in past in the selected printer; and
- based on the obtained history of the first print control, set a print setting value for the second print control to be conducted in the selected printer,
- wherein one of the first channel and the second channel is a channel, through which the computer readable instructions cause the information processing apparatus to rasterize image data for the image to be printed, and
- wherein the other of the first channel and the second channel is a channel, through which the computer readable instructions cause the printer to rasterize the image data.

\* \* \* \* \*